United States Patent
Matsumoto et al.

(10) Patent No.: US 10,153,664 B2
(45) Date of Patent: Dec. 11, 2018

(54) WIRELESS POWER TRANSMISSION SYSTEM AND POWER TRANSMITTER

(71) Applicant: Panasonic Intellectual Property Management Co., Ltd., Osaka (JP)

(72) Inventors: Hiromu Matsumoto, Osaka (JP); Hiroshi Kanno, Osaka (JP); Hiroshi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 214 days.

(21) Appl. No.: 15/367,254

(22) Filed: Dec. 2, 2016

(65) Prior Publication Data
US 2017/0229916 A1    Aug. 10, 2017

(30) Foreign Application Priority Data
Feb. 4, 2016    (JP) .................. 2016-019376

(51) Int. Cl.
*H02J 50/12* (2016.01)
*H02J 7/02* (2016.01)
*H02J 50/60* (2016.01)
*H02J 50/80* (2016.01)
*H02J 50/40* (2016.01)

(52) U.S. Cl.
CPC .............. *H02J 50/12* (2016.02); *H02J 7/025* (2013.01); *H02J 50/40* (2016.02); *H02J 50/60* (2016.02); *H02J 50/80* (2016.02)

(58) Field of Classification Search
CPC ..................................................... H02J 50/12
USPC ........................................................ 307/104
See application file for complete search history.

(56) References Cited

U.S. PATENT DOCUMENTS

| | | | |
|---|---|---|---|
| 2015/0048752 A1* | 2/2015 | Van Den Brink | H02J 5/005 315/246 |
| 2017/0054313 A1* | 2/2017 | Harakawa | H02K 7/083 |

FOREIGN PATENT DOCUMENTS

JP    2012-175869    9/2012

* cited by examiner

*Primary Examiner* — Joseph Chang
(74) *Attorney, Agent, or Firm* — Renner Otto Boisselle & Sklar, LLP

(57) ABSTRACT

A power transmitter includes: a first power transmission electrode having a flat surface; a second power transmission electrode that is spaced from the first power transmission electrode in a direction along the surface of the first power transmission electrode and has a flat surface; a power transmission circuit that is electrically connected to the first and second power transmission electrodes and outputs AC power to the first and second power transmission electrodes; a first conductive shield that is disposed between the first and second power transmission electrodes, the first conductive shield being spaced from each of the first and second power transmission electrodes; and at least one second conductive shield that is spaced from the first and second power transmission electrodes in a direction perpendicular to the surface of the first power transmission electrode and covers at least one of a first gap and a second gap, the first gap being disposed between the first power transmission electrode and the first shield, the second gap being disposed between the second power transmission electrode and the first shield.

16 Claims, 12 Drawing Sheets

COMPARATIVE EXAMPLE 1
W1 = 100 mm
G1 = 100 mm
T1 = 0.2 mm

COMPARATIVE EXAMPLE 2
W2 = 99 mm

FIRST EMBODIMENT
G2 = 89.5 mm
G3 = 0.5 mm
W3 = 10 mm
T2 = 0.2 mm

WIRELESS POWER TRANSMISSION SYSTEM AND POWER TRANSMITTER

BACKGROUND

1. Technical Field

The present disclosure relates to a power transmitter and wireless power transmission system that wirelessly transmit power.

2. Description of the Related Art

There have been developed in recent years wireless power transmission technologies that wirelessly (wirelessly) transmit power to a mobile device, such as a mobile phone or electric vehicle. Wireless power transmission technologies include methods such as the electromagnetic induction method and electric field coupling method. The electric field coupling method can wirelessly transmit power to a pair of power receiving electrodes by opposing a pair of power transmission electrodes and the pair of power receiving electrodes to each other and supplying AC power to the pair of power transmission electrodes. The electric field coupling method can be suitably used, for example, to transmit power from a pair of power transmission electrodes disposed on the floor to a load (e.g., the motor of a mobile robot). Japanese Unexamined Patent Application Publication No. 2012-175869 discloses an example of a wireless power transmission system using the electric field coupling method.

SUMMARY

In wireless power transmission using the conventional electric field coupling method, a leak electric field may occur between a pair of power transmission electrodes and affect a human body or the like. One non-limiting and exemplary embodiment provides a power transmitter and wireless power transmission system that can suppress the effects of a leak electric field between power transmission electrodes.

In one general aspect, the techniques disclosed here feature a power transmitter including a first power transmission electrode having a flat surface, a second power transmission electrode that is spaced from the first power transmission electrode in a direction along the surface of the first power transmission electrode and has a flat surface, a power transmission circuit that is electrically connected to the first and second power transmission electrodes and outputs AC power to the first and second power transmission electrodes, a first conductive shield that is disposed between the first and second power transmission electrodes, the first conductive shield being spaced from each of the first and second power transmission electrodes, and at least one second conductive shield that is spaced from the first and second power transmission electrodes in a direction perpendicular to the surface of the first power transmission electrode and covers at least one of a first gap and a second gap, the first gap being disposed between the first power transmission electrode and the first shield, the second gap being disposed between the second power transmission electrode and the first shield.

It should be noted that general or specific embodiments may be implemented as a system, a method, an integrated circuit, a computer program, a storage medium, or any selective combination thereof.

According to the one aspect of the present disclosure, it is possible to suppress the effects of a leak electric field between power transmission electrodes in a wireless power transmission system using the electric field coupling method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Before describing embodiments of the present disclosure, knowledge forming the basis of the present disclosure will be described.

The inventors found that the conventional wireless power transmission system described in the "Background Art" section posed the following problem.

Figure 1:
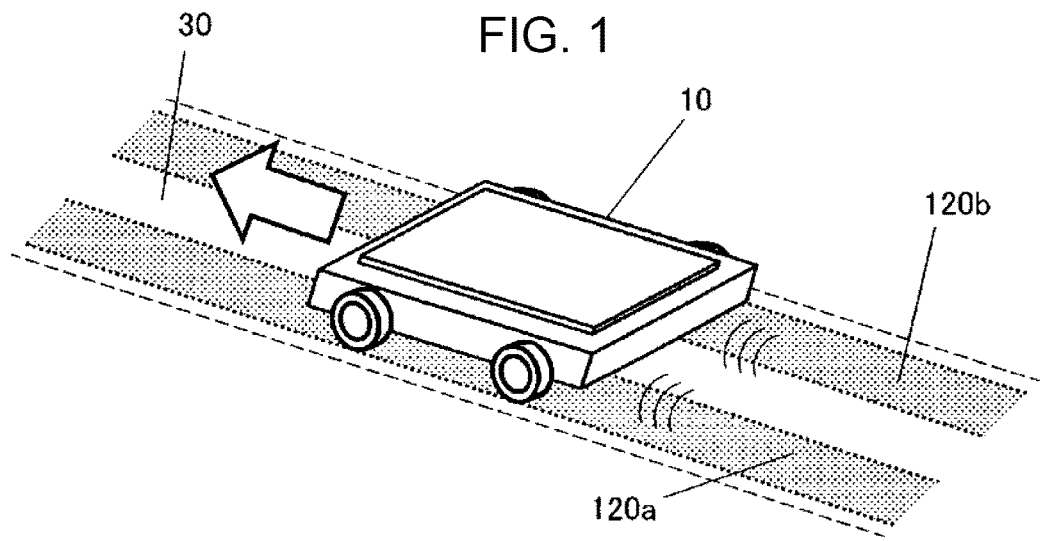
FIG. 1 is a diagram schematically showing an example of a wireless power transmission system using the electric field coupling method.

FIG. 1 is a diagram schematically showing an example of a wireless power transmission system using the electric field coupling method. The wireless power transmission system shown in FIG. 1 is, for example, a system that wirelessly transmits power to a carrying robot 10 [an automatic guided vehicle (AGV)] used to carry an article in a factory or the like. In this system, a pair of flat power transmission electrodes 120$a$, 120$b$ are placed on a floor 30. The carrying robot 10 includes a pair of power receiving electrodes 220$a$, 220$b$ that are opposed to the pair of power transmission electrodes 120$a$, 120$b$ and that receive AC power transmitted from the power transmission electrodes 120$a$, 120$b$. The power received is supplied to a load of the carrying robot 10, such as a motor or secondary battery, so that the carrying robot 10 is driven or charged.

Figure 2:
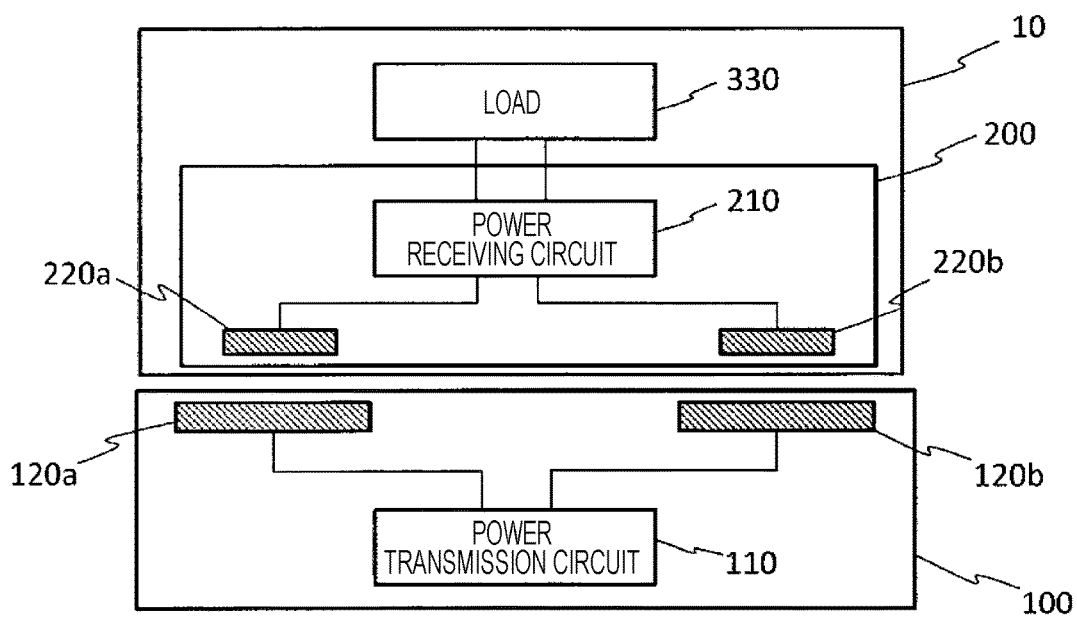
FIG. 2 is a diagram showing a schematic configuration of the wireless power transmission system shown in FIG. 1.

FIG. 2 is a diagram showing a schematic configuration of the wireless power transmission system shown in FIG. 1. The wireless power transmission system includes a power transmitter 100 and the carrying robot 10. The power transmitter 100 includes the pair of power transmission electrodes 120$a$, 120$b$ and a power transmission circuit 110 that supplies AC power to the power transmission electrodes 120$a$, 120$b$. The power transmission circuit 110 is, for example, an AC output circuit including an inverter circuit. The carrying robot 10 includes a power receiver 200 and a load 330. The power receiver 200 includes the pair of power receiving electrodes 220$a$, 220$b$ and a power receiving circuit 210 that converts power received by the power receiving electrodes 220$a$, 220$b$ into power required by the load 330 (e.g., a predetermined DC voltage) and supplies the power to the load 330. The power receiving circuit 210 includes, for example, a rectifier circuit. The load 330 is a device that consumes power, such as a motor or secondary battery. Power is wirelessly transmitted through electric field couplings (capacitive couplings) between the pair of power transmission electrodes 120$a$, 120$b$ and the pair of power receiving electrodes 220$a$, 220$b$, which are opposed to each other.

The inventors found that in the wireless power transmission system thus configured, an electric field leak occurred between the power transmission electrodes 120$a$, 120$b$ during power transmission, resulting in a safety problem.

Figure 3:
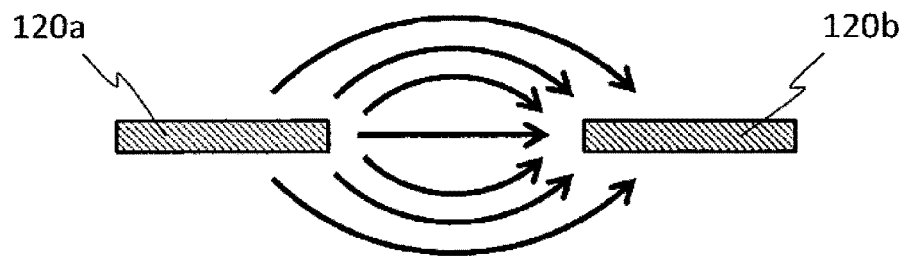
FIG. 3 is a diagram showing a problem with the wireless power transmission system shown in FIG. 2.

FIG. 3 is a diagram showing the problem with the wireless power transmission system shown in FIG. 2. FIG. 3 shows only the pair of power transmission electrodes 120$a$, 120$b$ of the elements of the wireless power transmission system shown in FIG. 2. Arrows in FIG. 3 schematically show electric lines of force between the power transmission electrodes 120$a$, 120$b$ at one moment. As shown in FIG. 3, a leak electric field, which does not contribute to power transmission, occurs between the pair of power transmission electrodes 120$a$, 120$b$. The leak electric field is increased as the power transmission electrodes 120$a$, 120$b$ are closer to each other or as larger power is transmitted.

As described above, a wireless power transmission system using the electric field coupling method is suitably used to supply power to a carrying robot or the like used in a factor or the like. Power transmitted in such a wireless power transmission system can be relatively large power of, for example, more than 1 kW. In such a system, a leak electric field between the power transmission electrodes 120$a$, 120$b$ may affect a living body around those electrodes, such as a person. That is, if a person erroneously approaches the power transmission electrodes 120$a$, 120$b$, a leak electric field may affect the body of the person.

The inventors considered a configuration for solving the above problem with the wireless power transmission system using the conventional electric field coupling method. First, the inventors considered a configuration in which a conductive shield is disposed between the power transmission electrodes 120$a$, 120$b$ in order to suppress the leak electric field.

Figure 4:
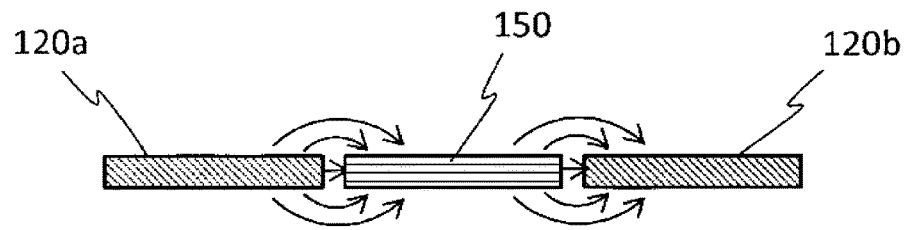
FIG. 4 is a diagram schematically showing an example of the configuration in which a first conductive shield is disposed between power transmission electrodes.

FIG. 4 is a diagram schematically showing an example of the configuration in which a first conductive shield 150 is disposed between the power transmission electrodes 120$a$, 120$b$. As shown in this example, the disposition of the first shield 150 allows the electric field concentration area to be reduced compared to the configuration shown in FIG. 3, allowing for an improvement in safety. However, even in this configuration, a leak electric field occurs around the gap between the power transmission electrode 120$a$ and first shield 150, and the effects thereof are not negligible. To ensure safety, it is preferred to suppress a leak electric field even around the gaps between the power transmission electrodes 120$a$, 120$b$ and first shield 150.

As a result of the above considerations, the inventors conceived of aspects of the present disclosure described below.

A power transmitter of one aspect of the present disclosure includes a first power transmission electrode having a flat surface, a second power transmission electrode that is spaced from the first power transmission electrode in a direction along the surface of the first power transmission electrode and has a flat surface, a power transmission circuit that is electrically connected to the first and second power transmission electrodes and outputs AC power to the first and second power transmission electrodes, a first conductive shield that is disposed between the first and second power transmission electrodes, the first conductive shield being spaced from each of the first and second power transmission electrodes, and at least one second conductive shield that is spaced from the first and second power transmission electrodes in a direction perpendicular to the surface of the first power transmission electrode and covers at least one of a first gap and a second gap, the first gap being disposed between the first power transmission electrode and the first shield, the second gap being disposed between the second power transmission electrode and the first shield.

According to the above aspect, the power transmitter includes the at least one second conductive shield that covers at least one of the first gap between the first power transmission electrode and first shield and the second gap between the second power transmission electrode and the first shield. Thus, the leak electric field around at least one of the first gap and second gap can be effectively suppressed. As a result, it is possible to further reduce the effects of the leak electric field on a human body or the like around the transmission electrodes.

In the present specification, the expression "a shield covers a gap" means that the shield is located so as to overlap at least part of the gap when seen from a direction perpendicular to the surface of an electrode adjacent to the gap. For example, if the power transmission electrodes 120a, 120b and first shield 150 shown in FIG. 4 have flat structures extending in a direction perpendicular to FIG. 4, the gaps therebetween have linear or belt shapes elongated in this direction. The second shield is disposed in a position that overlaps part or all of at least one of the gaps having such elongated shapes. The second shield may be disposed on the upper side or lower side of FIG. 4. If multiple second shields are disposed, the second shields may be disposed on one of the upper and lower sides of FIG. 4, or may be disposed on both sides. The gaps between the first and second power transmission electrodes and the first shield need not be air and may be space composed of an electrically insulating material (e.g., a resin). The first and second power transmission electrodes and the first and second shields may be covered by an electrically insulating material, such as a dielectric.

More specific embodiments of the present disclosure will be described below. Note that detailed description more than necessary may be omitted. For example, detailed description of an already well-known matter or repeated description of substantially the same configuration may be omitted. This aims to avoid the description below from becoming unnecessarily redundant and to facilitate the understanding of the description by those skilled in the art. The inventors provide the accompanying drawings and the description below so that those skilled in the art sufficiently understand the present disclosure and therefore do not intend to limit the subjects set forth in the claims using those. In the description below, the same or similar elements are given the same reference signs.

First Embodiment

Figure 5:
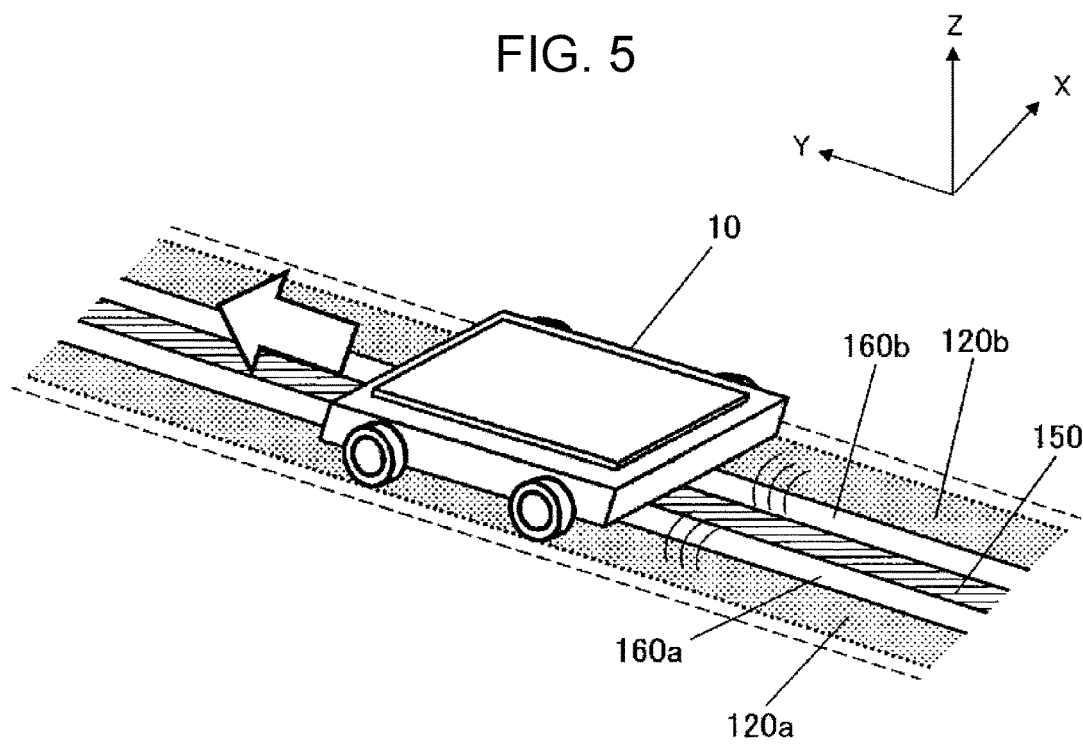
FIG. 5 is a diagram schematically showing a wireless power transmission system of a first embodiment of the present disclosure.

FIG. 5 is a diagram schematically showing a wireless power transmission system of a first embodiment of the present disclosure. In the system shown in FIG. 5, as in the system shown in FIG. 1, a power transmitter including a pair of power transmission electrodes 120a, 120b embedded in the floor wirelessly transmits power to a carrying robot 10 including a pair of power receiving electrodes. The wireless power transmission system of the present embodiment differs from the system in FIG. 1 in that the power transmitter includes a first shield 150 and two second shields, 160a and 160b. The first shield 150 is disposed between the first power transmission electrode 120a and second power transmission electrode 120b. The second shields 160a, 160b cover the two gaps between the power transmission electrodes 120a, 120b and first shield 150. The power transmission electrodes 120a, 120b extend along the floor in parallel, and the carrying robot 10 can move thereon while receiving power.

FIG. 5 shows XYZ coordinate axes showing X-, Y-, and Z-directions perpendicular to each other. The XYZ coordinates shown in FIG. 5 will be used in the description below. The direction in which the power transmission electrodes 120a, 120b, first shield 150, and second shields 160a, 160b extend is defined as the Y-direction; the direction perpendicular to the surfaces of the power transmission electrodes 120a, 120b as the Z-direction; and the direction perpendicular to the Y- and Z-directions as the X-direction. Note that the orientations of structures shown in the drawings of the present application are set considering the clarity of the description and are not intended to limit the orientations when the embodiments of the present disclosure are actually carried out. Also, the entire or partial shape or size of any structure shown in the drawings does not limit the actual shape or size.

Figure 6:
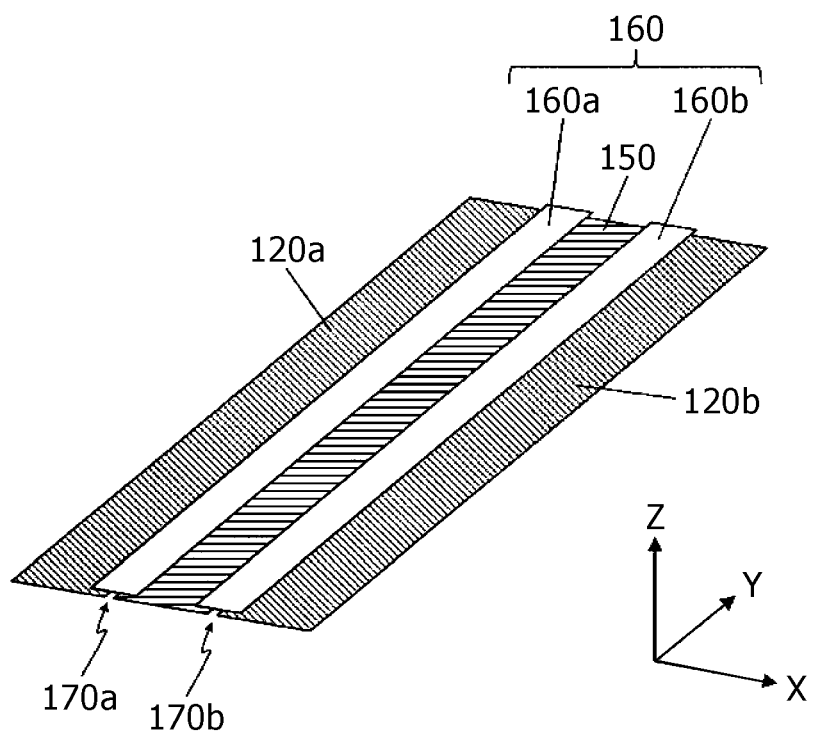
FIG. 6 is a perspective view schematically showing the disposition of power transmission electrodes, a first shield, and second shields of the first embodiment.

FIG. 6 is a perspective view schematically showing the disposition of the power transmission electrodes 120a, 120b, first shield 150, and second shields 160a, 160b of the present embodiment. Any of the power transmission electrodes 120a, 120b, first shield 150, and second shields 160a, 160b of the present embodiment has a flat structure and a flat surface. The power transmission electrodes 120a, 120b, first shield 150, and second shields 160a, 160b can be composed of, for example, a conductive material such as copper or aluminum. The second power transmission electrode 120b is spaced from the first power transmission electrode 120a in a direction along the surface of the first power transmission electrode 120a (in the X-direction in this example). The first shield 150 is disposed between the power transmission electrodes 120a, 120b so as to be spaced from the power transmission electrodes 120a, 120b by gaps 170a, 170b, respectively. The second shields 160a, 160b are spaced from the power transmission electrodes 120a, 120b in a direction perpendicular to the surfaces of power transmission electrodes 120a, 120b (in the Z-direction in this example). One of the second shields, 160a, covers the first gap 170a, which is the gap between the power transmission electrode 120a and first shield 150. The other second shield, 160b, covers the second gap 170b, which is the gap between the second power transmission electrode 120b and first shield 150.

Figure 7:
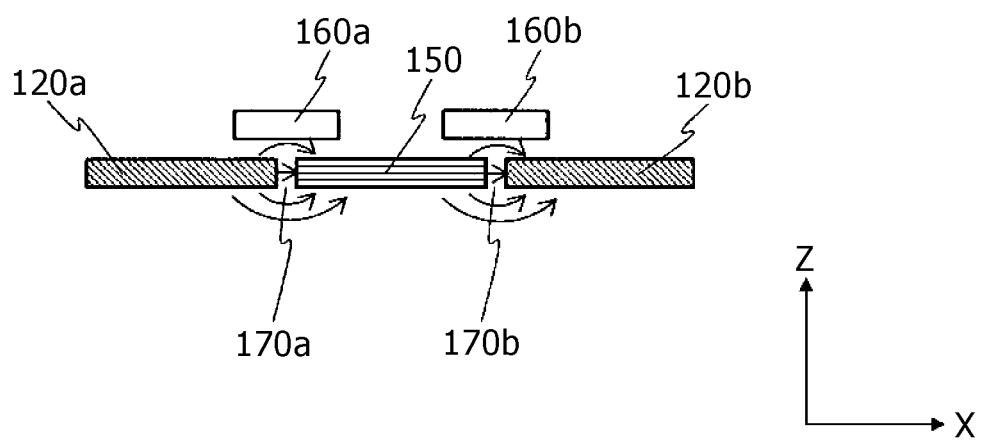
FIG. 7 is a diagram showing a cross-section parallel with an XZ-plane, of the power transmission electrodes, first shield, and second shields shown in FIG. 6.

FIG. 7 is a diagram showing a cross-section parallel with an XZ-plane, of the power transmission electrodes 120a, 120b, first shield 150, and second shields 160a, 160b shown in FIG. 6. In the present embodiment, the second shields 160a, 160b are disposed so as to cover the two gaps, 170a and 170b, between the power transmission electrodes 120a, 120b and first shield 150. Thus, it is possible to block the electric field over the first gap 170a, 170b and to reduce the effects thereof. While, in the present embodiment, the two gaps, 170a and 170b, are covered by the second shields 160a, 160b, respectively, only one of the gaps may be covered. As long as at least one of the gaps is covered by a conductive shield, the effects of the leak electric field can be reduced compared to the configuration of the comparative example shown in FIG. 4.

The leak electric field suppression effects of the present embodiment will be described below. The inventors performed a circuit and electromagnetic field simulation and verified the advantageous effects of the present embodiment by comparing the present embodiment with the configuration (Comparative Example 1) shown in FIG. 3 and the configuration shown in FIG. 4 (Comparative Example 2).

Figure 8A:
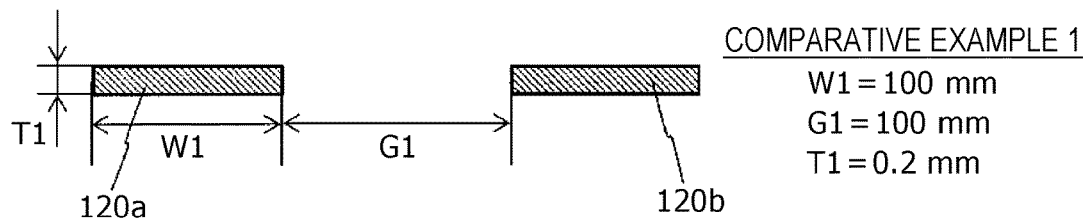
FIG. 8A is a diagram showing the configuration of Comparative Example 1 and the sizes of the elements thereof.
Figure 8B:
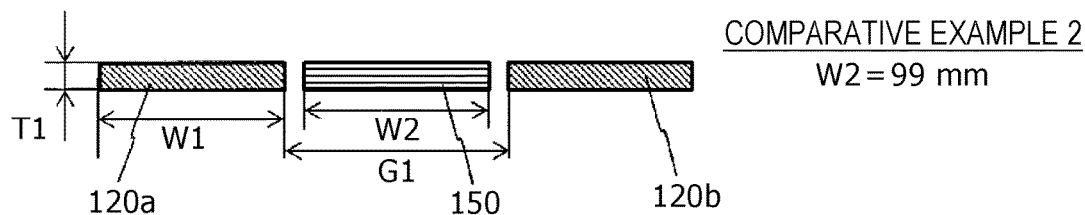
FIG. 8B is a diagram showing the configuration of Comparative Example 2 and the sizes of the elements thereof.
Figure 8C:
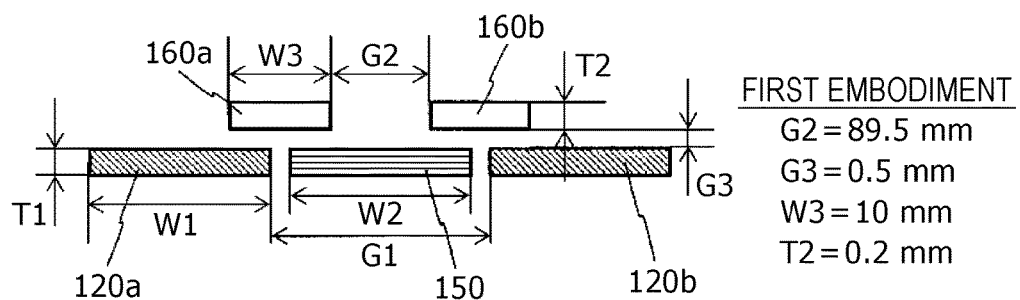
FIG. 8C is a diagram showing the configuration of the present embodiment and the sizes of the elements thereof.
Figure 9:
FIG. 9 is a diagram showing conditions for a simulation.
Figure 10:
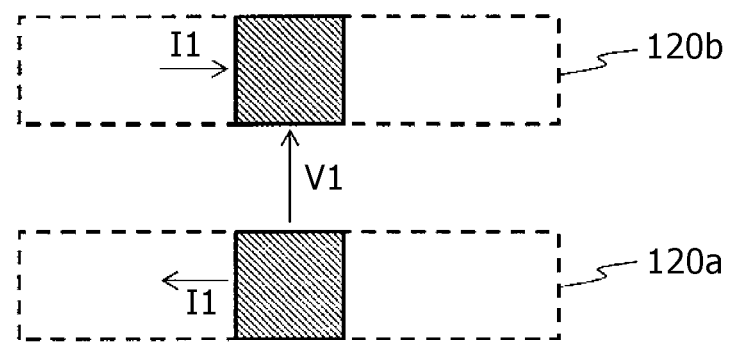
FIG. 10 is another diagram showing conditions for a simulation.

FIGS. 8A to 8C are diagrams showing conditions for this simulation. FIG. 8A shows the configuration of Comparative Example 1 and the sizes of the elements thereof; FIG. 8B shows the configuration of Comparative Example 2 and the sizes of the elements thereof; and FIG. 8C shows the configuration of the present embodiment and the sizes of the elements thereof. Parameters whose values are not described in FIG. 8B have the same values as those shown in FIG. 8A; and parameters whose values are not described in FIG. 8C have the same values as those shown in FIG. 8A or 8B. In any of the examples, the power transmission electrodes 120a, 120b, first shield 150, and second shields 160a, 160b had shapes that were sufficiently long in the Y-direction. Electric field strengths in positions spaced from the power transmission electrodes 120a, 120b by 10 mm were measured with respect to each of the three configurations, as shown in FIG. 9, and the electric field distributions were compared. In this simulation, analysis was conducted assuming that if a voltage V1 [V] is applied between lines consisting of the power transmission electrodes 120a, 120b and a current I1 [A] flows through the lines, as shown in FIG. 10, $|Z1|=|V1/I1|>500[\Omega]$ where Z1 represents the impedance (assuming that the current is almost negligible). Parameters were set so that $L1\ll\lambda1$ was satisfied where L1 represents the overall length of the line; and $\lambda1$ represents the wavelength of electromagnetic waves propagating through the lines.

Figure 11:
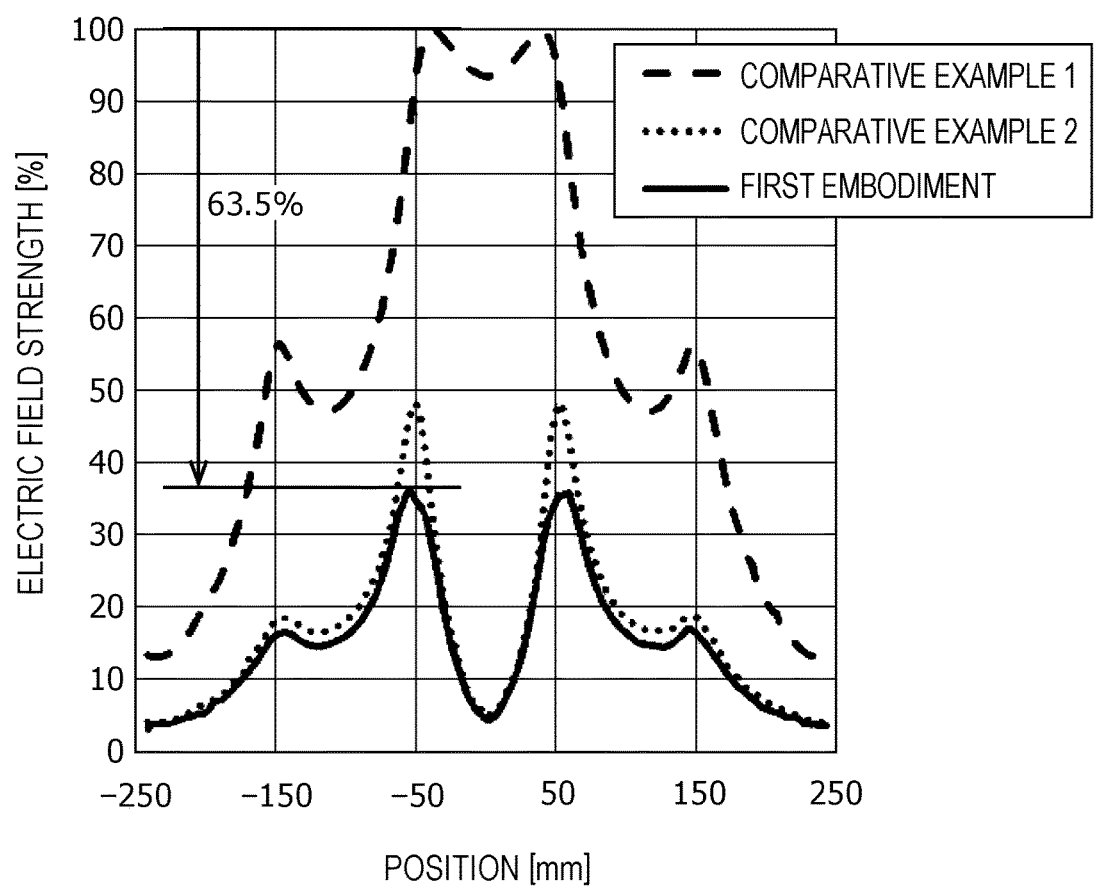
FIG. 11 is a graph showing the result of the simulation.

FIG. 11 is a graph showing the result of this simulation. This graph was obtained by calculating, as an electric field strength, the root mean square of the amplitude of an electric field in each phase in a cycle, standardizing the electric field strength using the peak value of Comparative Example 1, and plotting the values obtained. The horizontal axis of FIG. 11 represents the position in the X-direction when the midpoint between the power transmission electrodes 120a, 120b is the origin. FIG. 11 reveals that the configuration of the present embodiment could reduce the peak electric field strength by 63.5% compared to the configuration of the Comparative Example 1. FIG. 11 also reveals that the configuration of the present embodiment could reduce the electric field strengths in the positions (around ±50 mm) of the gaps 170a, 170b by 20% or more compared to the configuration of Comparative Example 2. While, in this simulation, the electric field strengths in positions spaced from the power transmission electrodes 120a, 120b by 10 mm were calculated, similar effects can be identified in other positions.

As seen above, the configuration of the present embodiment can significantly reduce the leak electric field from the power transmission electrodes 120a, 120b compared to the configurations of Comparative Examples 1, 2. As a result, even when a person erroneously approaches the power transmission electrodes 120a, 120b, the risk can be reduced.

Note that the shapes and sizes of the elements shown in FIG. 8C are illustrative only and various shapes and sizes may be selected in accordance with the use. The following are an example of the sizes of the elements: the lengths (the sizes in the Y-direction) of the power transmission electrodes 120a, 120b, first shield 150, and second shields 160a, 160b can be set in a range of, for example, 50 cm to 20 m; the widths (the sizes in the X-direction) of the power transmission electrodes 120a, 120b and first shield 150 can be set in a range of, for example, 5 to 200 cm; the widths of the gaps 170a, 170b between the power transmission electrodes 120a, 120b and first shield 150 can be set in a range of, for example, 0.1 to 100 mm; the distances between the surfaces of the power transmission electrodes 120a, 120b and the surfaces of the second shields 160a, 160b can be set in a range of, for example, 0.1 to 10 mm; the widths of the second shields 160a, 160b are set to larger values than those of the gaps 170a, 170b, respectively, and can be set in a range of, for example, 10 to 500 mm; and the widths of the second shields 160a, 160b may be larger than those of the power transmission electrodes 120a, 120b or first shield 150.

Next, the configuration of the wireless power transmission system of the present embodiment will be described more specifically. Note that the configuration of the system described below is illustrative only and may be properly changed in accordance with the required function and performance.

Figure 12:
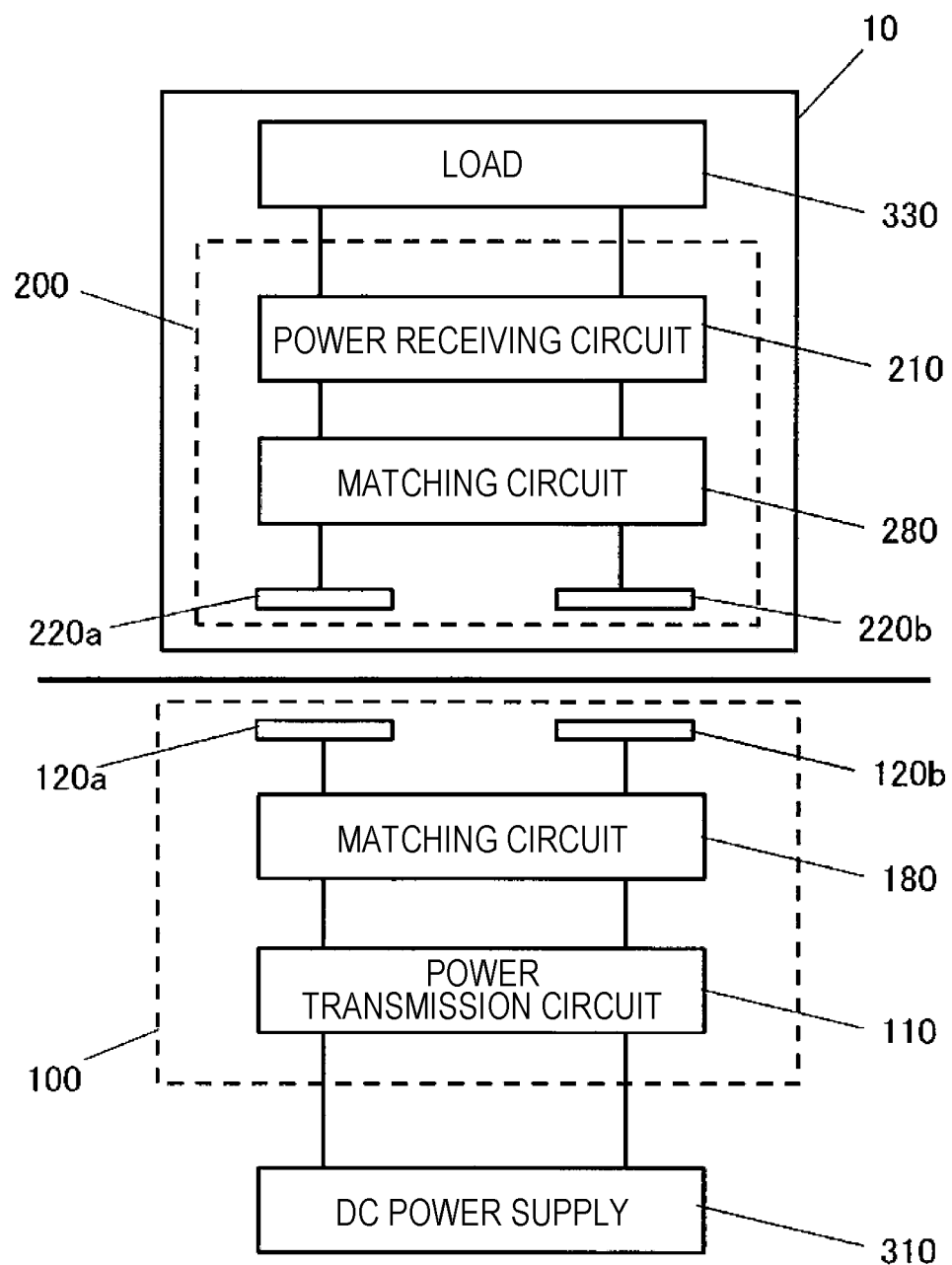
FIG. 12 is a block diagram showing a schematic configuration of the wireless power transmission system of the first embodiment.

FIG. 12 is a block diagram showing a schematic configuration of the wireless power transmission system of the present embodiment. This system includes a power transmitter 100 and a carrying robot 10. The power transmitter 100 includes a power transmission circuit 110 that converts DC power supplied from an external DC power supply 310 into AC power, the two power transmission electrodes, 120a and 120b, that transmit the AC power, and a matching circuit 180 connected between the power transmission circuit 110 and power transmission electrodes 120a, 120b. In the present embodiment, the power transmission circuit 110 is electrically connected to the first and second power transmission electrodes 120a, 120b through the matching circuit 180 and outputs AC power to the first and second power transmission electrodes 120a, 120b. The carrying robot 10 includes a power receiver 200 and a load 330. The power receiver 200 includes two power receiving electrodes, 220a and 220b, that receive power by generating capacitive couplings with the two power transmission electrodes, 120a and 120b, a matching circuit 280 connected to the two power receiving electrodes, 220a and 220b, and a power receiving circuit 210 that is connected to the matching circuit 280 and that converts the received AC power into DC power and outputs the DC power. When the first power receiving electrode 220a is opposed to the first power transmission electrode 120a, it generates a capacitive coupling with the first power transmission electrode 120a. When the second power receiving electrode 220b is opposed to the second power transmission electrode 120b, it generates a capacitive coupling with the second power transmission electrode 120b. Through the two capacitive couplings, the power transmitter 100 wirelessly transmits AC power to the power receiver 200. The load 330 includes, for example, a secondary battery or motor and is charged or driven by DC power outputted from the power receiving circuit 210.

Figure 13:
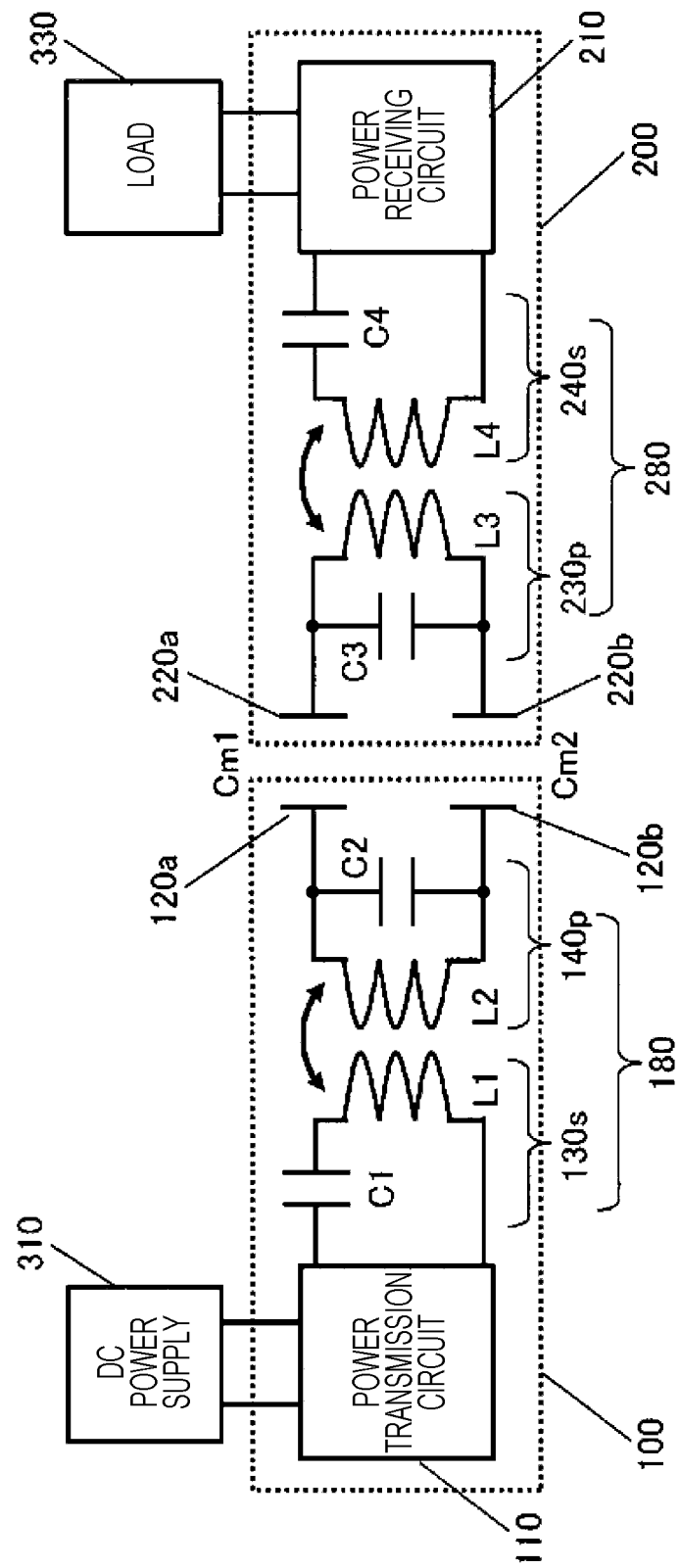
FIG. 13 is a circuit diagram showing a more detailed configuration example of the wireless power transmission system of the first embodiment.

FIG. 13 is a circuit diagram showing a more detailed configuration example of the wireless power transmission system. In the example shown in FIG. 13, the matching circuit 180 of the power transmitter 100 includes a series resonant circuit 130s connected to the power transmission circuit 110 and a parallel resonant circuit 140p that is connected to the power transmission electrodes 120a, 120b and that generates an inductive coupling with the series resonant circuit 130s. The matching circuit 180 has a function of matching the impedance of the power transmission circuit 110 and the impedances of the power transmission electrodes 120a, 120b. The series resonant circuit 130s of the power transmitter 100 has a configuration in which a first coil L1 and a first capacitor C1 are connected in series. The parallel resonant circuit 140p of the power transmitter 100 has a configuration in which a second coil L2 and a second capacitor C2 are connected in parallel. The first coil L1 and second coil L2 are coupled together by a predetermined coupling coefficient to constitute a transformer. The turn ratio between the first coil L1 and second coil L2 is set to a value at which a desired transformer ratio (a step-up ratio or step-down ratio) is obtained.

The matching circuit 280 of the power receiver 200 includes a parallel resonant circuit 230p connected to the power receiving electrodes 220a, 220b and a series resonant circuit 240s that is connected to the power receiving circuit 210 and that generates an inductive coupling with the parallel resonant circuit 230p. The matching circuit 280 has a function of matching the impedance of the power receiving electrodes 220a, 220b and the impedance of the power receiving circuit 210. The parallel resonant circuit 230p has a configuration in which a third coil L3 and a third capacitor C3 are connected in parallel. The series resonant circuit 240s of the power receiver 200 has a configuration in which a fourth coil L4 and a fourth capacitor C4 are connected in series. The third coil and fourth coil are coupled together by a predetermined coupling coefficient to constitute a transformer. The turn ratio between the third coil L3 and fourth coil L4 is set to a value at which a desired transformer ratio is obtained.

The configurations of the matching circuits 180, 280 are not limited to those shown in FIG. 13. For example, parallel resonant circuits may be disposed in place of the series resonant circuits 130s, 240s, or series resonant circuits may be disposed in place of the parallel resonant circuits 140p, 230p. Further, one or both of the matching circuits 180, 280 may be omitted. If the matching circuit 180 is omitted, the power transmission circuit 110 and power transmission electrodes 120a, 120b are directly connected; if the matching circuit 280 is omitted, the power receiving circuit 210 and power receiving electrodes 220a, 220b are directly connected. In the present specification, the configuration in which the matching circuit 180 is disposed also corresponds to the configuration in which the power transmission circuit 110 and power transmission electrodes 120a, 120b are electrically connected. Similarly, the configuration in which the matching circuit 280 is disposed also corresponds to the configuration in which the power receiving circuit 210 and power receiving electrodes 220a, 220b are electrically connected.

The elements will be described in more detail. In the present specification, reference signs L1, L2, L3, and L4 representing inductors are also used as signs representing the inductance values of the inductors. Similarly, reference signs C1, C2, C3, and C4 representing capacitors are also used as signs representing the capacitance values of the capacitors.

Figure 14:
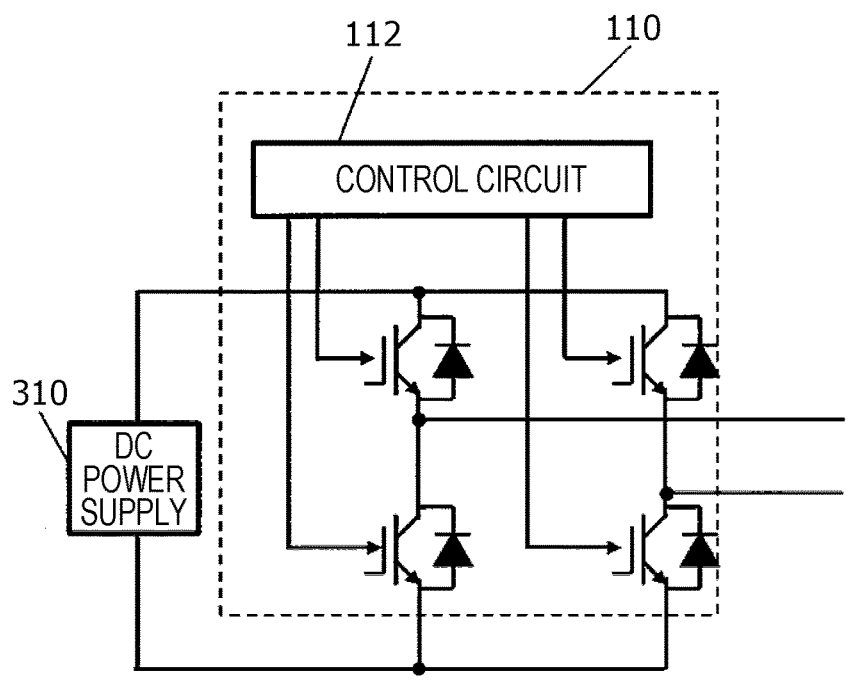
FIG. 14 is a diagram schematically showing an example configuration of a power transmission circuit.

FIG. 14 is a diagram schematically showing an example configuration of the power transmission circuit 110. In this example, the power transmission circuit 110 includes a full-bridge inverter circuit including four switching elements (e.g., transistors such as IGBTs or MOSFETs) and a control circuit 112. The control circuit 112 includes a gate driver that outputs a control signal for controlling the on (conductive) and off (non-conductive) states of each switching element and a processor that causes the gate driver to output a control signal, such as a microcontroller. A half-bridge inverter circuit or other types of oscillation circuits, such as E-class, may be used in place of the full-bridge inverter circuit shown in FIG. 14. The power transmission circuit 110 may include a modulation/demodulation circuit for communication or any type of sensor for measuring the voltage, current, or the like. If the power transmission circuit 110 includes a modulation/demodulation circuit for communication, it can transmit data to the power receiver 200 in such a manner that the data is superimposed on AC power. Note that the present disclosure also includes an aspect in which a weak AC signal (e.g., a pulse signal) is transmitted to the power receiver 200 for data transmission purposes rather than for power transmission purposes. Since it can be said that weak power is transmitted even in such an aspect, the transmission of a weak AC signal (e.g., a pulse signal) is also included in the concept of "power transmission." Also, such a weak AC signal is included in the concept of "AC power."

Figure 15:
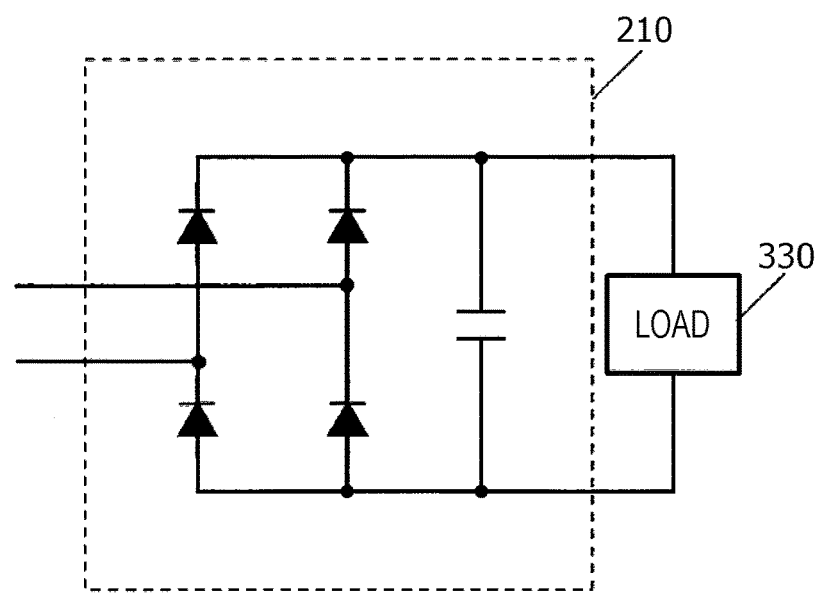
FIG. 15 is a diagram schematically showing an example configuration of a power receiving circuit.

FIG. 15 is a diagram schematically showing an example configuration of the power receiving circuit 210. In this example, the power receiving circuit 210 is a full-wave rectifier circuit including a diode bridge and a smoothing capacitor. The power receiving circuit 210 may have the configuration of a different type of rectifier. The power receiving circuit 210 may include the rectifier circuit, as well as any other type of circuit, such as a constant voltage/constant current control circuit or a modulation/demodulation for communication. The power receiving circuit 210 converts received AC energy into DC energy which can be used by the load 330. The power receiving circuit 210 may include any type of sensor for measuring the voltage, current, or the like outputted from the series resonant circuit 240s.

The coils of the series resonant circuit 130s, parallel resonant circuit 140p, parallel resonant circuit 230p, and series resonant circuit 240s may be, for example, flat coils or multilayer coils disposed on a circuit board, or winding coils using copper wires, litz wires, twisted wires, or the like. The capacitors of the series resonant circuit 130s, parallel resonant circuit 140p, parallel resonant circuit 230p, and series resonant circuit 240s may be, for example, any type of capacitors having chip shapes or lead shapes. The capacitance through the air between two wires may be caused to serve as each capacitor. The self-resonance characteristics of the coils may be used in place of the capacitors.

The DC power supply 310 may be, for example, any type of power supply, including a commercial power supply, a primary battery, a secondary battery, a solar cell, a fuel cell, a universal serial bus (USB) power supply, a high-capacity capacitor (e.g., an electric double-layer capacitor), and a transformer connected to a commercial power supply.

Typically, the resonant frequencies f0 of the series resonant circuit 130s, parallel resonant circuit 140p, parallel resonant circuit 230p, and series resonant circuit 240s are set so as to match the transmission frequency f at which power is transmitted. Note that the resonant frequencies f0 of the series resonant circuit 130s, parallel resonant circuit 140p, parallel resonant circuit 230p, and series resonant circuit 240s need not exactly match the transmission frequency f. The resonant frequency f0 of each circuit may be set to a value on the order of 50 to 150% of the transmission frequency f. The power transmission frequency f is set to, for example, 50 Hz to 300 GHz, preferably 20 kHz to 10 GHz, more preferably 20 kHz to 20 MHz, even more preferably 20 kHz to 1 MHz.

In the present embodiment, there are gaps between the power transmission electrodes 120a, 120b and power receiving electrodes 220a, 220b, and the distances therebetween are relatively long (e.g., the order of 100 mm). For this reason, the capacitances cm1, cm2 between the electrodes are very small, and the impedances of the power transmission electrodes 120a, 120b and power receiving electrodes 220a, 220b are very high (e.g., the order of several kΩ). On the other hand, the impedances of the power transmission circuit 110 and power receiving circuit 210 are as low as, for example, the order of several Ω. In the present embodiment, the parallel resonant circuits 140p, 230p are disposed so as to be close to the power transmission electrodes 120a, 120b and power receiving electrodes 220a, 220b, respectively, and the series resonant circuits 130s, 240s are disposed so as to be close to the power transmission circuit 110 and power receiving circuit 210, respectively. According to this configuration, the impedances can be easily matched. A series resonant circuit is suitable for matching a low impedance, since the impedance becomes zero (0) during resonance; a parallel resonant circuit is suitable for matching a high impedance, since the impedance becomes infinite during resonance. Accordingly, by disposing a series resonant circuit so as to be close to a low-impedance power supply and disposing a parallel resonant circuit so as to be close to a high-impedance electrode, as seen in the configuration shown in FIG. 13, the impedances can be easily matched. Similarly, by disposing a parallel resonant circuit so as to be close to an electrode and disposing a series resonant circuit so as to be close to a load, the impedances can be suitably matched in the power receiver 200.

Note that if the distances between the power transmission electrodes 120a, 120b and power receiving electrodes 220a, 220b are reduced, or if a dielectric is disposed therebetween, the impedances of the electrodes are reduced and therefore there is no need to use an asymmetrical resonant circuit configuration as described above. If there is no problem with impedance matching, the matching circuits 180, 280 themselves may be omitted.

As seen above, the wireless power transmitter of the present embodiment includes the first power transmission electrode 120a having a flat surface, the second power transmission electrode 120b that is spaced from the first power transmission electrode 120a in the direction along the surface of the first power transmission electrode 120a (in the X-direction) and has a flat surface, the power transmission circuit 110 that is electrically connected to the first and second power transmission electrodes 120a, 120b and that outputs AC power to the first and second power transmission electrodes 120a, 120b, the first conductive shield 150 disposed between the first power transmission electrode 120a and second power transmission electrode 120b so as to be spaced from the first power transmission electrode 120a and second power transmission electrode 120b by the gaps, and the two second conductive shields 160a, 160b that are spaced from the first and second power transmission electrodes 120a, 120b in the direction perpendicular to the surface of the first power transmission electrode 120a (in the Z-direction) and that cover both the first gap 170a between the first power transmission electrode 120a and first shield 150 and the second gap 170b between the second power transmission electrode 120b and first shield 150. The first power transmission electrode 120a and second power transmission electrode 120b extend in the first direction (in the Y-direction) and are spaced from each other in the second direction perpendicular to the first direction and parallel with the surface of the first power transmission electrode 120a (in the X-direction). The two second shields, 160a and 160b, cover the first and second gaps 170a, 170b on the same side of the first shield 150.

According to this configuration, it is possible to suppress the leak electric field not only between the power transmission electrodes 120a, 120b, but also near the two gaps, 170a and 170b. As a result, it is possible to improve the safety of the wireless power transmission system using the electric field coupling method.

Second Embodiment

Figure 16:
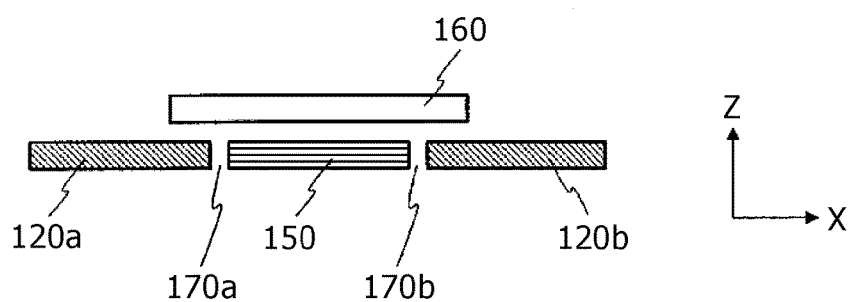
FIG. 16 is a sectional view schematically showing the configuration of power transmission electrodes, a first shield, and a second shield of a second embodiment of the present disclosure.

FIG. 16 is a sectional view schematically showing the configuration of power transmission electrodes 120a, 120b, a first shield 150, and a second shield 160 of a second embodiment of the present disclosure. The present embodiment differs from the first embodiment in that the single second shield 160 covers both of two gaps, 170a and 170b. The other elements are the same as those of the first embodiment.

By disposing a single second shield 160 as seen in the present embodiment, the structure can be simplified compared to the first embodiment.

The inventors verified the electric field strength reduction effects of the configuration of the present embodiment using the method described with reference to FIGS. 8A to 11. Specifically, a similar simulation was performed with respect to the configuration in which the integrated second shield 160 was disposed in place of the second shields 160a, 160b in the configuration shown in FIG. 8C. The peak electric field strength of the present embodiment was lower than the peak value of Comparative Example 1 by 62.7%.

Third Embodiment

Figure 17:
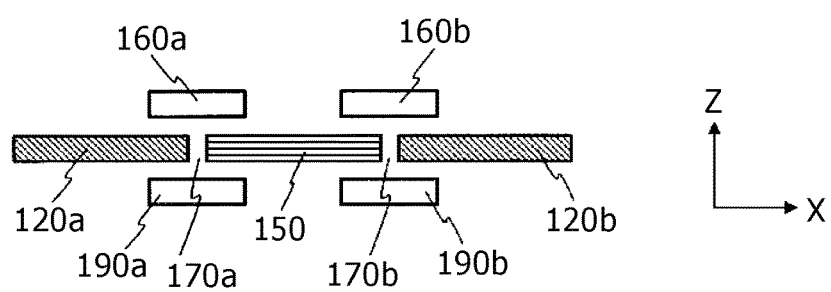
FIG. 17 is a sectional view schematically showing the configuration of power transmission electrodes, a first shield, and second shields of a third embodiment of the present disclosure.

FIG. 17 is a sectional view schematically showing the configuration of power transmission electrodes 120a, 120b, a first shield 150, second shields 160a, 160b, and third shields 190a, 190b of a third embodiment of the present disclosure. The present embodiment differs from the first embodiment in that a power transmitter 100 further includes the third shields 190a, 190b. The other elements are the same as those of the first embodiment.

The third shields 190a, 190b are spaced from the power transmission electrodes 120a, 120b in a direction perpendicular to the surfaces of the power transmission electrodes 120a, 120b (in the negative direction of a Z-axis). The third shields 190a, 190b cover both first and second gaps 170a, 170b on the side remote from the second shields 160a, 160b, of the first shield 150 (on the negative Z-direction side of the first shield 150). While, in the present embodiment, the two third shields, 190a and 190b, are disposed, at least one third shield for covering at least one of the gaps 170a, 170b may be disposed.

As seen in the present embodiment, conductive shields may be disposed on both sides of the power transmission electrodes 120a, 120b and first shield 150. According to this configuration, the leak electric field can be further reduced. By further disposing the third shields 190a, 190b below the gaps 170a, 170b, it is also possible to suppress changes in the impedances of the electrodes caused by the effects of a metal or the like under the floor. Further, effects on an animal or the like under the floor can be reduced.

The inventors verified the electric field strength reduction effects of the present embodiment using the method described with reference to FIGS. 8A to 11. Specifically, a similar simulation was performed with respect to the configuration in which the third shields 190a, 190b shown in FIG. 17 were disposed in addition to the second shields 160a, 160b in the configuration shown in FIG. 8C. The peak electric field strength of the present embodiment was lower than the peak value of Comparative Example 1 by 86.2%. The leak electric field could be significantly reduced by covering the gaps 170a, 170b from both sides.

Fourth Embodiment

Figure 18:
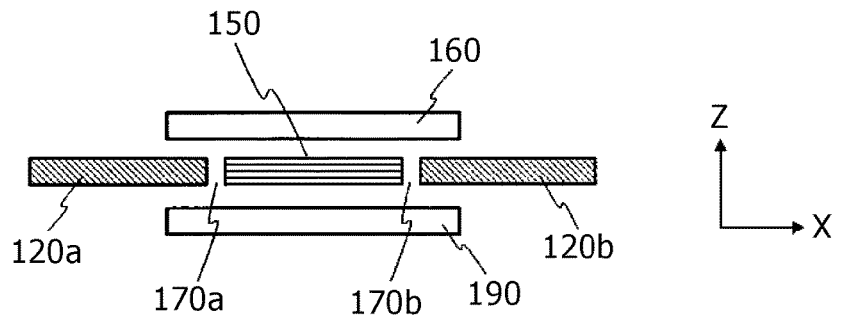
FIG. 18 is a sectional view schematically showing the configuration of power transmission electrodes, a first shield, a second shield, and a third shield of a fourth embodiment of the present disclosure.

FIG. 18 is a sectional view schematically showing the configuration of power transmission electrodes 120a, 120b, a first shield 150, a second shield 160, and a third shield 190 of a fourth embodiment of the present disclosure. The present embodiment differs from the configuration of the second embodiment shown in FIG. 16 in that a power transmitter 100 further includes a third shield 190. The other elements are the same as those of the second embodiment.

The third shield 190 is spaced from the power transmission electrodes 120*a*, 120*b* in a direction perpendicular to surfaces of the power transmission electrodes 120*a*, 120*b* (in a negative Z-direction). The third shield 190 covers both gaps 170*a*, 170*b* on the side remote from the second shield 160, of the first shield 150 (on the negative Z-direction side of the first shield 150).

As seen in the present embodiment, one conductive shield may be disposed on each side of the power transmission electrodes 120*a*, 120*b* and first shield 150. According to this configuration, the leak electric field can be further reduced compared to the configuration of the second embodiment shown in FIG. 16. By further disposing the third shield 190 below the gaps 170*a*, 170*b*, it is also possible to suppress changes in the impedances of the electrodes caused by the effects of a metal or the like under the floor. Also, effects on an animal or the like under the floor can be reduced.

The inventors verified the electric field strength reduction effects of the configuration of the present embodiment using the method described with reference to FIGS. 8A to 11. Specifically, a similar simulation was performed with respect to the configuration in which the second shield 160 was disposed in place of the second shields 160*a*, 160*b* in the configuration shown in FIG. 8C and the third shield 190 shown in FIG. 17 was disposed. The peak electric field strength of the present embodiment was lower than the peak value of Comparative Example 1 by 93.6%. The leak electric field could be reduced by covering the gaps 170*a*, 170*b* from both sides.

Fifth Embodiment

Figure 19:
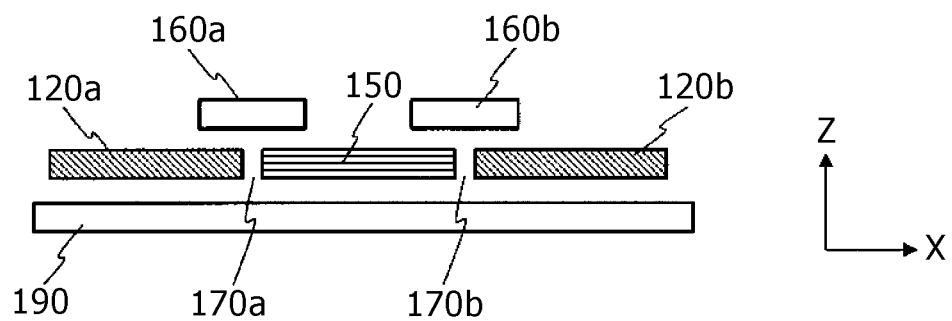
FIG. 19 is a sectional view schematically showing the configuration of power transmission electrodes, a first shield, second shields, and a third shield of a fifth embodiment of the present disclosure.

FIG. 19 is a sectional view schematically showing the configuration of power transmission electrodes 120*a*, 120*b*, a first shield 150, second shield 160*a*, 160*b*, and a third shield 190 of a fifth embodiment of the present disclosure. The present embodiment differs from the configuration of the first embodiment in that a power transmitter 100 further includes a third shield 190. The other elements are the same as those of the first embodiment.

The third shield 190 is spaced from the power transmission electrodes 120*a*, 120*b* in a direction perpendicular to surfaces of the power transmission electrodes 120*a*, 120*b* (in the negative direction of a Z-axis). The third shield 190 covers both gaps 170*a*, 170*b* on the side remote from the second shields 160*a*, 160*b*, of the first shield 150 (on the negative Z-direction side of the first shield 150). The third shield 190 of the present embodiment is larger than the third shield 190 shown in FIG. 18 and covers the entire surfaces of the power transmission electrodes 120*a*, 120*b*.

As seen in the present embodiment, multiple second shields, 160*a* and 160*b*, may be disposed on one side of first power transmission electrode 120*a*, 120*b* and a first shield 150, and a single third shield 190 may be disposed on the other side. According to the configuration of the present embodiment, the large third shield 190 is disposed below the gaps 170*a*, 170*b* and thus the effects of the ground on the installation place and the effects of the installation place on the ground can be significantly reduced.

Sixth Embodiment

Figure 20:
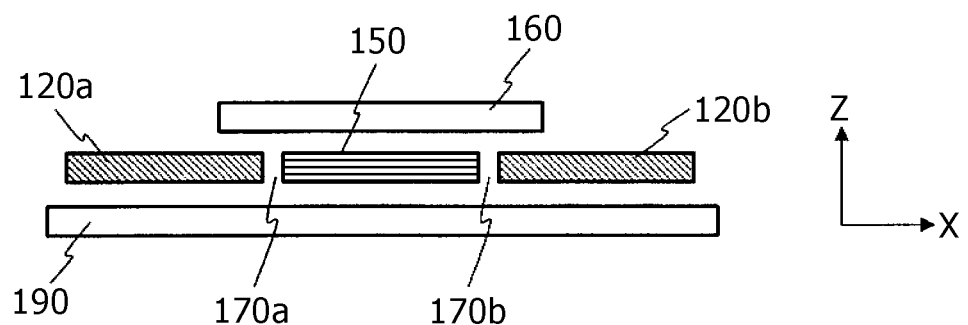
FIG. 20 is a sectional view schematically showing the configuration of power transmission electrodes, a first shield, a second shield, and a third shield of a sixth embodiment of the present disclosure.

FIG. 20 is a sectional view schematically showing the configuration of power transmission electrodes 120*a*, 120*b*, a first shield 150, a second shield 160, and a third shield 190 of a sixth embodiment of the present disclosure. The present embodiment has a configuration in which the area of the third shield 190 of the fourth embodiment shown in FIG. 18 is further increased. In the present embodiment, as in the fifth embodiment, the effects of the ground on the installation place and the effects of the installation place on the ground can be significantly reduced.

Other Embodiments

Figure 21:
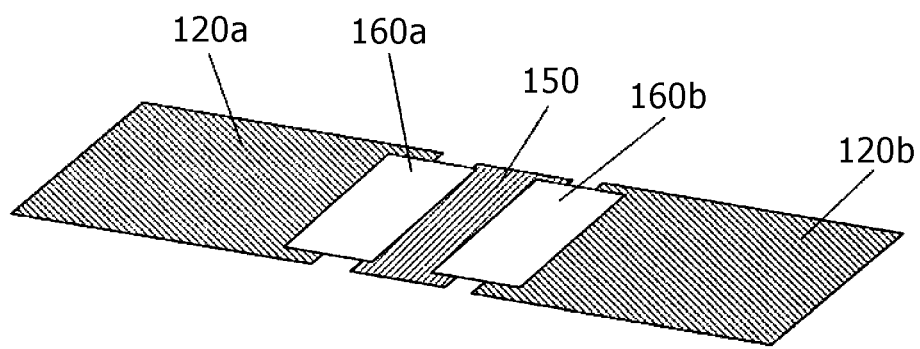
FIG. 21 is a perspective view schematically showing the disposition of power transmission electrodes, a first shield, and second shields of another embodiment of the present disclosure.
Figure 22:
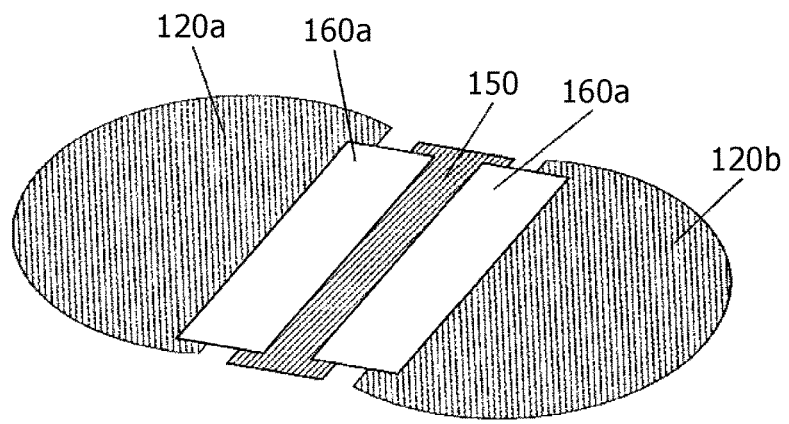
FIG. 22 is a perspective view schematically showing the disposition of power transmission electrodes, a first shield, and second shields of yet another embodiment of the present disclosure.

FIGS. 21 and 22 are perspective views schematically showing the disposition of power transmission electrodes 120*a*, 120*b*, a first shield 150, and second shields 160*a*, 160*b* of other embodiments of the present disclosure. In the embodiment shown in FIG. 21, the power transmission electrodes 120*a*, 120*b* have rectangular shapes which are somewhat horizontally long; in the embodiment shown in FIG. 22, the power transmission electrodes 120*a*, 120*b* have shapes like parts of ellipses. These configurations can also be used, for example, in a configuration in which a power receiver 200 is charged while being stationary with respect to the power transmission electrodes 120*a*, 120*b*.

Figure 23:
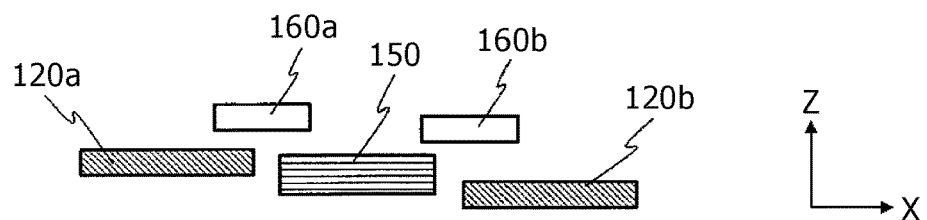
FIG. 23 is a sectional view schematically showing the disposition of power transmission electrodes, a first shield, and second shields of still yet another embodiment of the present disclosure.

FIG. 23 is a sectional view schematically showing the disposition of power transmission electrodes 120*a*, 120*b*, a first shield 150, and second shields 160*a*, 160*b* of yet another embodiment of the present disclosure. In the embodiment shown in FIG. 23, surfaces of the power transmission electrodes 120*a*, 120*b* are not flush with each other. Also, surfaces of the second shields 160*a*, 160*b* are not flush with each other. As seen above, the surfaces of the power transmission electrodes 120*a*, 120*b* need not be flush with each other. Configurations as shown in FIG. 23 also correspond to the configuration in which the second power transmission electrode 120*b* is spaced from the first power transmission electrode 120*a* in a direction along the surface of the first power transmission electrode 120*a*.

Figure 24:
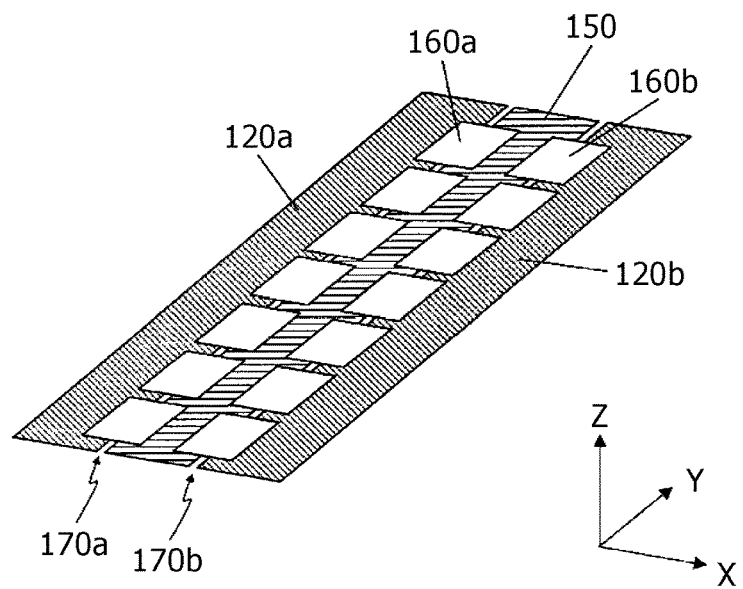
FIG. 24 is a perspective view schematically showing the disposition of power transmission electrodes, a first shield, and second shields of further still another embodiment of the present disclosure.

FIG. 24 is a perspective view schematically showing the disposition of power transmission electrodes 120*a*, 120*b*, a first shield 150, and second shields 160*a*, 160*b* of still yet another embodiment of the present disclosure. In this embodiment, the second shields 160*a*, 160*b* are divided into multiple portions in a first direction (in a Y-direction). As seen above, the second shields 160*a*, 160*b* need not extend in the Y-direction. Similarly, the first shield 150 and a third shield 190 may also be divided into multiple portions in the Y-direction.

While, in the above embodiments, any of the power transmission electrodes 120*a*, 120*b*, first shield 150, second shield 160 (or second shields 160*a*, 160*b*), and third shield 190 (or third shields 190*a*, 190*b*) has a flat shape, these elements may have other shapes. For example, the elements may have curved shapes or uneven shapes. The power transmission electrodes 120*a*, 120*b*, first shield 150, second shield 160 (or second shields 160*a*, 160*b*), and third shield 190 (or third shields 190*a*, 190*b*) need not necessarily be disposed along the floor or ground and may be inclined with respect to the floor or ground.

As seen above, the present disclosure includes power transmitters and wireless power transmission systems described in the following items.

[Item 1]

A power transmitter including:

a first power transmission electrode having a flat surface;

a second power transmission electrode that is spaced from the first power transmission electrode in a direction along the surface of the first power transmission electrode and has a flat surface;

a power transmission circuit that is electrically connected to the first and second power transmission electrodes and outputs AC power to the first and second power transmission electrodes;

a first conductive shield that is disposed between the first and second power transmission electrodes, the first conductive shield being spaced from each of the first and second power transmission electrodes; and at least one second conductive shield that is spaced from the first and second power transmission electrodes in a direction perpendicular to the surface of the first power transmission electrode and covers at least one of a first gap between the first power transmission electrode and the first shield and a second gap between the second power transmission electrode and the first shield.

According to the above aspect, the power transmitter includes the at least one second conductive shield that covers at least one of a first gap and a second gap, the first gap being disposed between the first power transmission electrode and the first shield, the second gap being disposed between the second power transmission electrode and the first shield. Thus, the leak electric field around at least one of the first gap and second gap can be effectively suppressed. As a result, it is possible to further reduce the effects of the leak electric field on a human body or the like therearound and thus to transmit a larger amount of power.

[Item 2]

The power transmitter of Item 1, wherein the first and second power transmission electrodes extend in a first direction and are spaced from each other in a second direction which is a direction perpendicular to the first direction and which is a direction parallel with the surface of the first power transmission electrode.

Thus, power can be transmitted to a moving motor-driven vehicle, such as an automatic guided vehicle (AGV).

[Item 3]

The power transmitter of Item 2, wherein at least one of the first shield and the second shield extend in the first direction.

Thus, the shield can have a structure similar to the power transmission electrodes and therefore can be produced easily.

[Item 4]

The power transmitter of any one of Items 1 to 3, wherein the surface of the first power transmission electrode and the surface of the second power transmission electrode are flush with each other.

Thus, surfaces of two power receiving electrodes can be made flush with each other and therefore the receiving electrodes can be easily designed.

[Item 5]

The power transmitter of any one of Items 1 to 4, wherein the at least one second shield covers both the first gap and the second gap.

Thus, the leak electric field reduction effects can be increased.

[Item 6]

The power transmitter of any one of Items 1 to 5, wherein
the at least one second shield includes multiple second shields, and
the second shields cover the first and second gaps on an identical side of the first shield.

Thus, the leak electric field reduction effects can be increased.

[Item 7]

The power transmitter of any one of Items 1 to 6, further including at least one third shield that is spaced from the first and second power transmission electrodes in a direction perpendicular to the surface of the first power transmission electrode and covers at least one of the first and second gaps on a side remote from the second shield, of the first shield.

Thus, it is also possible to suppress the leakage of the electric field onto the side remote from power receiving electrodes, of the first field, allowing for the suppression of effects, such as variations in the impedances of the electrodes caused by a foreign object around the installation place, such as a metal. As a result, the freedom degree of the installation of the power transmitter can be increased.

[Item 8]

The power transmitter of Item 7, wherein the at least one third shield includes multiple third shields, and the third shields cover the first and second gaps on an identical side of the first shield.

Thus, it is also possible to suppress the leakage of the electric field onto the side remote from power receiving electrodes, of the first shield, allowing for the suppression of effects, such as variations in the impedances of the electrodes caused by a foreign object around the installation place, such as a metal. As a result, the freedom degree of the installation of the power transmitter can be increased.

[Item 9]

A wireless power transmission system including a power transmitter and a power receiver, wherein
the power transmitter includes:
a first power transmission electrode having a flat surface;
a second power transmission electrode that is spaced from the first power transmission electrode in a direction along the surface of the first power transmission electrode and has a flat surface;
a power transmission circuit that is electrically connected to the first and second power transmission electrodes and outputs AC power to the first and second power transmission electrodes;
a first conductive shield that is disposed between the first and second power transmission electrodes, the first conductive shield being spaced from each of the first and second power transmission electrodes; and
at least one second conductive shield that is spaced from the first and second power transmission electrodes in a direction perpendicular to the surface of the first power transmission electrode and covers at least one of a first gap and a second gap, the first gap being disposed between the first power transmission electrode and the first shield, the second gap being disposed between the second power transmission electrode and the first shield,
the power receiver includes:
a first power receiving electrode that when opposed to the first power transmission electrode, generates a capacitive coupling with the first power transmission electrode; and
a second power receiving electrode that when opposed to the second power transmission electrode, generates a capacitive coupling with the second power transmission electrode, and
the AC power is wirelessly transmitted from the power transmitter to the power receiver through the two capacitive couplings.

[Item 10]

The wireless power transmission system of Item 9, wherein the first and second power transmission electrodes extend in a first direction and are spaced from each other in a second direction which is a direction perpendicular to the first direction and which is a direction parallel with the surface of the first power transmission electrode.

[Item 11]

The wireless power transmission system of Item 10, wherein at least one of the first shield and the second shield extends in the first direction.

[Item 12]

The wireless power transmission system of any one of Items 9 to 11, wherein the surface of the first power transmission electrode and the surface of the second power transmission electrode are flush with each other.

[Item 13]

The wireless power transmission system of any one of Items 9 to 12, wherein the at least one second shield covers both the first gap and the second gap.

[Item 14]

The wireless power transmission system of any one of Items 9 to 13, wherein
the at least one second shield includes multiple second shields, and
the second shields cover the first and second gaps on an identical side of the first shield.

[Item 15]

The wireless power transmission system of any one of Items 9 to 14, further including at least one third shield that is spaced from the first and second power transmission electrodes in a direction perpendicular to the surface of the first power transmission electrode and covers at least one of the first and second gaps on a side remote from the second shield, of the first shield.

[Item 16]

The wireless power transmission system of Item 15, wherein the at least one third shield includes multiple third shields, and the third shields cover the first and second gaps on an identical side of the first shield.

The technology of the present disclosure can be used in any device driven by power. For example, this technology can be suitably used in a carrying robot used in a factory, such as an automatic guided vehicle (AGV), or a motor-driven vehicle.

What is claimed is:

1. A power transmitter comprising:
a first power transmission electrode having a flat surface;
a second power transmission electrode that is spaced from the first power transmission electrode in a direction along the surface of the first power transmission electrode and has a flat surface;
a power transmission circuit that is electrically connected to the first and second power transmission electrodes and outputs AC power to the first and second power transmission electrodes;
a first conductive shield that is disposed between the first and second power transmission electrodes, the first conductive shield being spaced from each of the first and second power transmission electrodes; and
at least one second conductive shield that is spaced from the first and second power transmission electrodes in a direction perpendicular to the surface of the first power transmission electrode and covers at least one of a first gap and a second gap, the first gap being disposed between the first power transmission electrode and the first shield, the second gap being disposed between the second power transmission electrode and the first shield.

2. The power transmitter of claim 1, wherein
the first and second power transmission electrodes extend in a first direction and are spaced from each other in a second direction which is a direction perpendicular to the first direction and which is a direction parallel with the surface of the first power transmission electrode.

3. The power transmitter of claim 2, wherein at least one of the first shield and the second shield extend in the first direction.

4. The power transmitter of claim 1, wherein the surface of the first power transmission electrode and the surface of the second power transmission electrode are flush with each other.

5. The power transmitter of claim 1, wherein the at least one second shield covers both the first gap and the second gap.

6. The power transmitter of claim 1, wherein
the at least one second shield comprises a plurality of second shields, and
the second shields cover the first and second gaps on an identical side of the first shield.

7. The power transmitter of claim 1, further comprising at least one third shield that is spaced from the first and second power transmission electrodes in a direction perpendicular to the surface of the first power transmission electrode and covers at least one of the first and second gaps on a side remote from the second shield, of the first shield.

8. The power transmitter of claim 7, wherein
the at least one third shield comprises a plurality of third shields, and
the third shields cover the first and second gaps on an identical side of the first shield.

9. A wireless power transmission system comprising:
a power transmitter; and
a power receiver, wherein
the power transmitter comprises:
a first power transmission electrode having a flat surface;
a second power transmission electrode that is spaced from the first power transmission electrode in a direction along the surface of the first power transmission electrode and has a flat surface;
a power transmission circuit that is electrically connected to the first and second power transmission electrodes and outputs AC power to the first and second power transmission electrodes;
a first conductive shield that is disposed between the first and second power transmission electrodes, the first conductive shield being spaced from each of the first and second power transmission electrodes; and
at least one second conductive shield that is spaced from the first and second power transmission electrodes in a direction perpendicular to the surface of the first power transmission electrode and covers at least one of a first gap and a second gap, the first gap being disposed between the first power transmission electrode and the first shield, the second gap being disposed between the second power transmission electrode and the first shield,
the power receiver comprises:
a first power receiving electrode that when opposed to the first power transmission electrode, generates a capacitive coupling with the first power transmission electrode; and
a second power receiving electrode that when opposed to the second power transmission electrode, generates a capacitive coupling with the second power transmission electrode, and the AC power is wirelessly transmitted from the power transmitter to the power receiver through the two capacitive couplings.

10. The wireless power transmission system of claim 9, wherein
the first and second power transmission electrodes extend in a first direction and are spaced from each other in a second direction which is a direction perpendicular to the first direction and which is a direction parallel with the surface of the first power transmission electrode.

11. The wireless power transmission system of claim 10, wherein at least one of the first shield and the second shield extends in the first direction.

12. The wireless power transmission system of claim 9, wherein the surface of the first power transmission electrode and the surface of the second power transmission electrode are flush with each other.

13. The wireless power transmission system of claim 9, wherein the at least one second shield covers both the first gap and the second gap.

14. The wireless power transmission system of claim 9, wherein
the at least one second shield comprises a plurality of second shields, and
the second shields cover the first and second gaps on an identical side of the first shield.

15. The wireless power transmission system of claim 9, further comprising at least one third shield that is spaced from the first and second power transmission electrodes in a direction perpendicular to the surface of the first power transmission electrode and covers at least one of the first and second gaps on a side remote from the second shield, of the first shield.

16. The wireless power transmission system of claim 15, wherein
the at least one third shield comprises a plurality of third shields, and
the third shields cover the first and second gaps on an identical side of the first shield.

\* \* \* \* \*